US012332589B2

(12) United States Patent
Kugaya

(10) Patent No.: US 12,332,589 B2
(45) Date of Patent: Jun. 17, 2025

(54) HEATING DEVICE WITH PROTECTIVE COMPONENT PROTECTING HEAT PIPE, HEATING PROCESS APPARATUS USING THE SAME, AND IMAGE FORMING APPARATUS

(71) Applicant: FUJIFILM Business Innovation Corp., Tokyo (JP)

(72) Inventor: Kenji Kugaya, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/895,023

(22) Filed: Aug. 24, 2022

(65) Prior Publication Data

US 2023/0314991 A1 Oct. 5, 2023

(30) Foreign Application Priority Data

Mar. 29, 2022 (JP) ................................ 2022-052966

(51) Int. Cl.
*G03G 15/20* (2006.01)

(52) U.S. Cl.
CPC ..... *G03G 15/2053* (2013.01); *G03G 15/2032* (2013.01)

(58) Field of Classification Search
None
See application file for complete search history.

(56) References Cited

U.S. PATENT DOCUMENTS 8,644,746 B2 * 2/2014 Maruyama ......... G03G 15/2042 399/329
11,624,997 B2 * 4/2023 Morizaki ........... G03G 15/2046 399/88
2002/0164176 A1 * 11/2002 Lee ...................... H05B 3/0095 399/90

FOREIGN PATENT DOCUMENTS

| | | | | |
|---|---|---|---|---|
| DE | 102020212698 | A1 | * | 4/2022 |
| JP | H09229576 | A | * | 9/1997 |
| JP | 4729195 | B2 | * | 7/2011 |
| JP | 2013142834 | | | 7/2013 |
| WO | WO-0146758 | A1 | * | 6/2001 |
| WO | WO-2010044125 | A1 | * | 4/2010 |

OTHER PUBLICATIONS

Translation to English of WO-2010044125-A1 (Year: 2010).*
Translation to English of WO-0146758-A1 (Year: 2001).*
Translation to English of JP-H09229576-A (Year: 1997).*
Translation to English of DE-102020212698-A1 (Year: 2022).*
Translation to English of JP-4729195-B2.*

* cited by examiner

*Primary Examiner* — Arlene Heredia
(74) *Attorney, Agent, or Firm* — JCIPRNET

(57) ABSTRACT

A heating device includes a heat generation unit that has a heat generation portion generating heat along a longitudinal direction, and heats a heated body; a heat pipe that extends along the longitudinal direction of the heat generation portion by being in contact with the heat generation unit or the heated body; and a holding unit that holds the heat pipe, in which the holding unit has an accommodation receiving portion that accommodates the heat pipe, and a protective component that keeps an end portion on a sealing portion side of the heat pipe and an end portion of the accommodation receiving portion in a non-contact manner via a space portion.

7 Claims, 7 Drawing Sheets

HEATING DEVICE WITH PROTECTIVE COMPONENT PROTECTING HEAT PIPE, HEATING PROCESS APPARATUS USING THE SAME, AND IMAGE FORMING APPARATUS

CROSS-REFERENCE TO RELATED APPLICATIONS

This application is based on and claims priority under 35 USC 119 from Japanese Patent Application No. 2022-052966 filed Mar. 29, 2022.

BACKGROUND

(i) Technical Field

The present invention relates to a heating device provided with a heat generation unit using a heat pipe, a heating process apparatus using the same, and an image forming apparatus.

(ii) Related Art

In the related art, examples of this type of heating device include a device described in JP2013-142834A (DETAILED DESCRIPTION, and FIG. 1).

JP2013-142834A (DETAILED DESCRIPTION, and FIG. 1) discloses an image forming apparatus that suppresses a temperature rise of a non-paper feeding portion and reduces a start-up time, by using a heater with a heating element printed on a surface of a plate-shaped heat pipe with a low heat capacity via an insulating layer.

SUMMARY

Aspects of non-limiting embodiments of the present disclosure relate to a heating device that includes a heat generation unit using a heat pipe, and can protect a sealing portion of the heat pipe.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a heating device includes a heat generation unit that has a heat generation portion generating heat along a longitudinal direction, and heats a heated body; a heat pipe that extends along the longitudinal direction of the heat generation portion by being in contact with the heat generation unit or the heated body; and a holding unit that holds the heat pipe, in which the holding unit has an accommodation receiving portion that accommodates the heat pipe, and a protective component that keeps an end portion on a sealing portion side of the heat pipe and an end portion of the accommodation receiving portion in a non-contact manner via a space portion.

BRIEF DESCRIPTION OF THE DRAWINGS

Exemplary embodiment(s) of the present invention will be described in detail based on the following figures, wherein.

DETAILED DESCRIPTION

Outline of Exemplary Embodiment

Figure 1A:
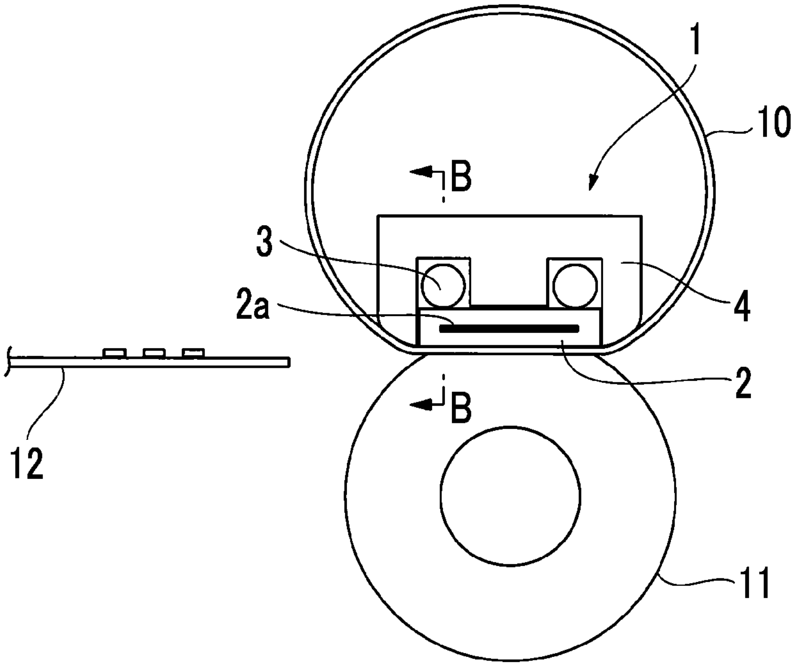
FIG. 1A is an explanatory diagram showing an outline of an exemplary embodiment of a heating process apparatus including a heating device to which the invention is applied.

FIG. 1A is an explanatory diagram showing an outline of an exemplary embodiment of a heating process apparatus including a heating device to which the invention is applied.

In FIG. 1A, the heating process apparatus includes a rotating belt-shaped heated body 10; a heating device 1 provided in the heated body 10; a pressurization unit 11 that rotates in contact with a portion facing the heating device 1 with the heated body 10 interposed therebetween to pressurize a heating process target 12.

Here, either one of the heated body 10 or the pressurization unit 11 may be driven to rotate so that the other is driven to rotate.

Figure 1B:
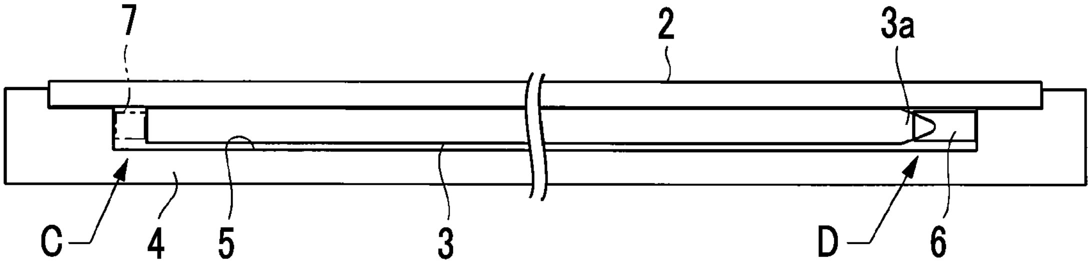
FIG. 1B is an arrow view seen from a B direction with a main part of the heating device shown in FIG. 1A turned upside down.
Figure 1C:
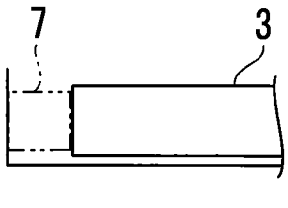
FIG. 1C is an enlarged view of a portion C in FIG. 1B.
Figure 1D:
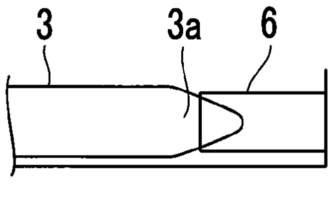
FIG. 1D is an enlarged view of a portion D in FIG. 1B as seen from the direction of B.

Then, in this example, as shown in FIGS. 1A, 1B, and 1D, the heating device 1 includes a heat generation unit 2 that has a heat generation portion 2*a* that generates heat, along a longitudinal direction, and heats the heated body 10; a heat pipe 3 that is in contact with the heat generation unit 2 and extends along the longitudinal direction of the heat generation portion 2*a*, and a holding unit 4 that holds the heat pipe 3, and the holding unit 4 has an accommodation receiving portion 5 that accommodates the heat pipe 3, and a protective component 6 that keeps a portion between an end portion on a sealing portion 3*a* of the heat pipe 3 and an end portion of the accommodation receiving portion 5 in a non-contact manner via a space portion.

In this example, the holding unit 4 has the accommodation receiving portion 5 that holds the heat generation unit 2, but the disclosure is not limited thereto, and it is needless to say that the heat generation unit 2 may be held by a dedicated holding unit different from the holding unit 4. Further, in the example shown in FIGS. 1A to 1D, the heat pipe 3 is in direct contact with the heat generation unit 2, but instead of this, the heat pipe 3 may be in direct contact with the heated body 10.

In such technical means, the heat generation unit 2 is not limited to a planar heat generation unit, and includes a heat generation unit having a heat generation portion 2*a*, widely.

The cross-sectional shape of the heat pipe 3 is not particularly limited, but a heat pipe having a circular cross-section is preferable from the viewpoint of strength. In this example, the heat pipe 3 is structurally formed by incorporating a hydraulic fluid and a capillary structure (so-called wick) into a pipe member having one open end, crimping the open end of the pipe member, and sealing the pipe member by welding. Therefore, it should be noted that the end portion on the sealing portion 3*a* side of the heat pipe 3 tends to be easily damaged by, for example, an impact in a case where the heating device 1 is dropped.

Further, the holding unit 4 may include the accommodation receiving portion 5 and the protective component 6 for the heat pipe 3. Here, the protective component 6 may be configured to prevent the end portion on the sealing portion 3*a* side of the heat pipe 3 from colliding with the end portion of the accommodation receiving portion 5 to be damaged in a case where the heating device 1 is dropped or the like, and may be configured to keep at least the end portion of the accommodation receiving portion 5 and the end portion on the sealing portion 3*a* side of the heat pipe 3 in a non-contact manner via a space portion. In this way, in a case where a spacer is simply interposed between the end portion of the sealing portion 3*a* of the heat pipe 3 and the end portion of the accommodation receiving portion 5, there is a possibility that the impact from the end portion of the accommodation receiving portion 5 is directly transmitted via the spacer in contact with the sealing portion 3*a* of the heat pipe 3, so that the requirement to "keep in a non-contact manner via the space portion" is intended to avoid the possibility.

Next, a typical mode or a preferable mode of the present exemplary embodiment will be described.

First, an example of the typical mode of the protective component 6 includes an elastic member that can be elastically deformed along a longitudinal direction of the heat pipe 3. This example is preferable in that, by using an elastic member for the protective component 6, even in a case where the heat pipe 3 is thermally expanded and deformed, for example, the amount of the deformation can be absorbed.

In this example, an example of the preferable mode of the protective component 6 includes a compression coil spring that has an inner diameter smaller than the outer diameter of the heat pipe 3 and can be elastically deformed along the longitudinal direction of the heat pipe 3. In this case, in order for the end portion of the sealing portion 3*a* of the heat pipe 3 to be disposed in a non-contact manner with respect to the end portion of the accommodation receiving portion 5 even in a case where the compression coil spring is compression and deformed, for example, the compression coil spring preferably has a solid length that is longer than the dimension of the sealing portion 3*a* of the heat pipe 3 protruding in the longitudinal direction in a region where the protective component 6 is mounted.

Further, an example of another typical mode of the protective component 6 includes an inelastic member. In this example, as long as the inelastic member is a cylindrical member that has an inner diameter smaller than the outer diameter of the heat pipe 3 and surrounds the end portion on the sealing portion 3*a* side of the heat pipe 3, the inelastic member can be configured to keep the end portion of the sealing portion 3*a* of the heat pipe 3 and the end portion of the accommodation receiving portion 5 in a non-contact manner via the space portion. In this case, for example, the cylindrical member preferably has an axial length longer than the dimension of the sealing portion 3*a* of the heat pipe 3 protruding in the longitudinal direction in the region where the protective component 6 is mounted.

Further, an example of a preferable mode of the holding unit 4 includes a mode in which an elastic component 7 is interposed between the end portion of the accommodation receiving portion 5 and an end portion of the heat pipe 3 on a side opposite to the sealing portion 3*a*, for example, as shown in FIGS. 1B and 1C. In this example, since both end portions of the heat pipe 3 are held by the protective component 6 and the elastic component 7 at the end portions of the accommodation receiving portion 5, both end portions of the heat pipe 3 no longer directly collide with the end portions of the accommodation receiving portion 5, and thus in a case where the protective component 6 is elastic, the heat pipe 3 is elastically held at both ends, or even in a case where the protective component 6 is inelastic, the thermal expansion deformation of the heat pipe 3 is effectively absorbed by the elasticity of the elastic component 7.

First Exemplary Embodiment

Overall Configuration of Image Forming Apparatus

Hereinafter, the present invention will be described in more detail on the basis of the exemplary embodiments shown in the accompanying drawings.

Figure 2:
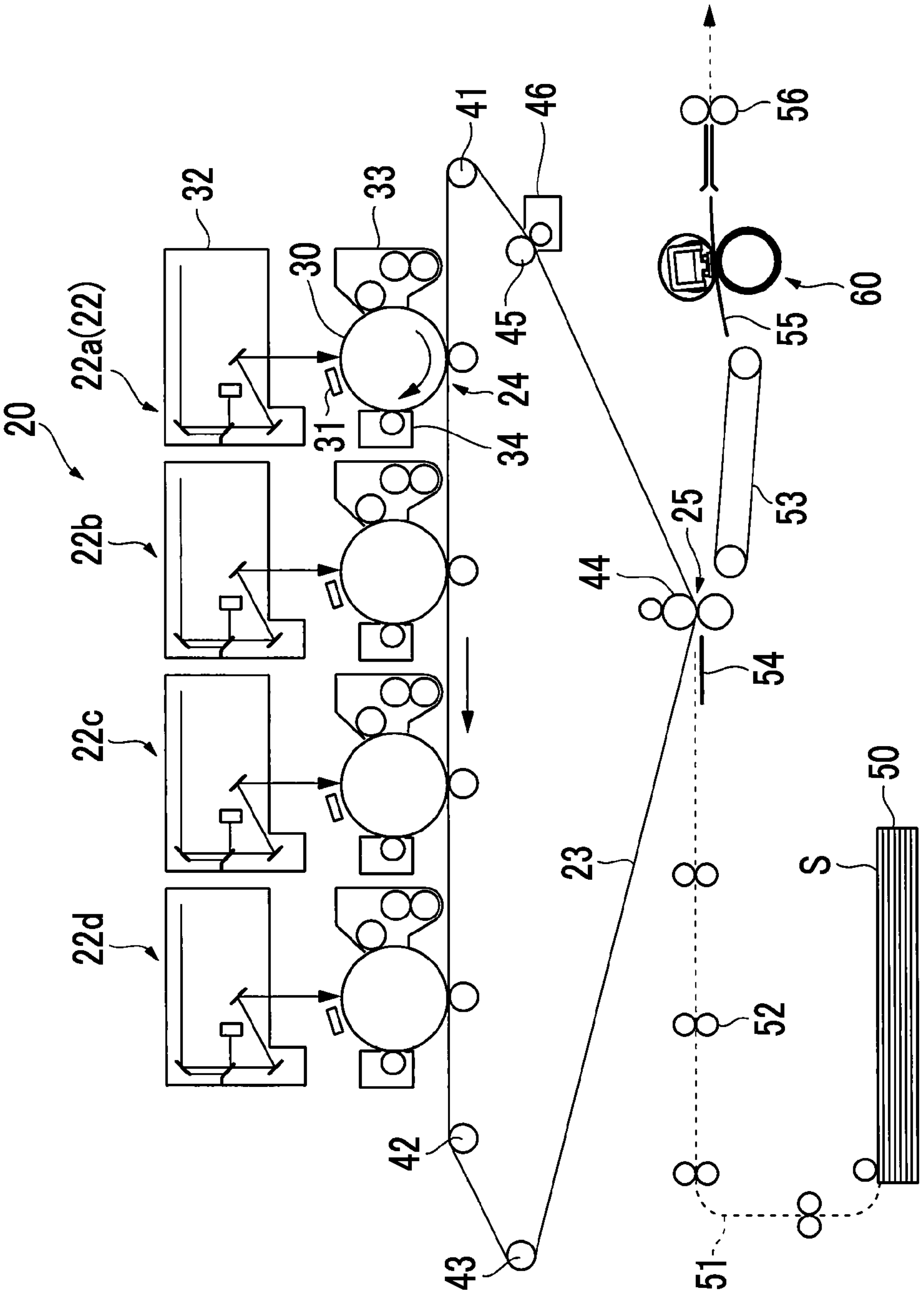
FIG. 2 is an explanatory diagram showing an overall configuration of an image forming apparatus according to a first exemplary embodiment.

FIG. 2 is an explanatory diagram showing an overall configuration of an image forming apparatus according to a first exemplary embodiment.

In FIG. 2, an image forming apparatus 20 is a so-called tandem type image forming apparatus of an intermediate transfer method, and has a plurality of image forming units 22 (22*a* to 22*d*) in which a toner image of each color component (in this example, four colors of yellow (Y), magenta (M), cyan (C), and black (K)) is formed by an electrophotographic method. A belt-shaped intermediate transfer body 23 is disposed at a position corresponding to each image forming unit 22, and a primary transfer device 24 (in this example, primary transfer roll) is disposed on the back surface of the intermediate transfer body 23 corresponding to each image forming unit 22. Further, a secondary transfer device (in this example, secondary transfer roll) 25 is arranged, at a part of the intermediate transfer body 23, the secondary transfer device 25 transfers a toner image of each color component, which is primarily transferred from the image forming unit 22 to the intermediate transfer body 23 by the primary transfer device 24, to a medium S such as paper. Further, a fixing device 60 as a fixing unit is disposed on a downstream side in a transport direction of the medium S on which the toner image of the color component is transferred, so as to fix the unfixed toner image on the medium S.

In this example, the plurality of image forming units 22, the intermediate transfer body 23, the primary transfer device 24, and the secondary transfer device 25 correspond to an imaging unit for forming an unfixed image on the medium.

Here, each image forming unit 22 has a drum-shaped photoconductor 30 that rotates in a predetermined direction; a charging device 31 that charges the photoconductor 30; an exposure device 32 such as a laser scanning device that writes an electrostatic latent image on the photoconductor 30 charged by the charging device 31; a developing device 33 that develops the electrostatic latent image written on the photoconductor 30 by the exposure device 32 with a corresponding color toner; and a cleaning device 34 that cleans residues on the photoconductor 30 after the toner image developed by the developing device 33 is primarily transferred onto the intermediate transfer body 23 by the primary transfer device 24, and the charging device 31, the exposure device 32, the developing device 33, and the cleaning device 34 are arranged around the photoconductor 30.

Further, the intermediate transfer body 23 is hung on a plurality of tension rolls 41 to 45, and for example, the tension roll 41 is used as a drive roll to circulate and rotate in a predetermined direction. Further, the tension roll 44 also serves as an opposing roll of the secondary transfer roll as the secondary transfer device 25, and is configured to generate a secondary transfer electric field for the secondary transfer between the secondary transfer roll and the opposing roll. Further, an intermediate transfer cleaning device 46 is disposed on the surface of the intermediate transfer body 23 corresponding to the tension roll 45.

Further, a medium supply device 50 is provided below the intermediate transfer body 23, and the medium S supplied from the medium supply device 50 is transported along a transport path 51 to the fixing device 60 via the secondary transfer device 25. In the transport path 51, there are provided an appropriate number of transport rolls 52, a transport belt 53 for the transportation from the secondary transfer device 25 to the fixing device 60, further, guide plates 54 and 55 that guide the medium S to a secondary transfer part by the secondary transfer device 25 and a fixing part of the fixing device 60, respectively, a discharge roll 56 for discharging the medium S to a medium discharge unit (not shown), and the like.

Fixing Device

Next, the fixing device 60 used in the present exemplary embodiment will be described with reference to FIGS. 3A and 3B.

Figure 3A:
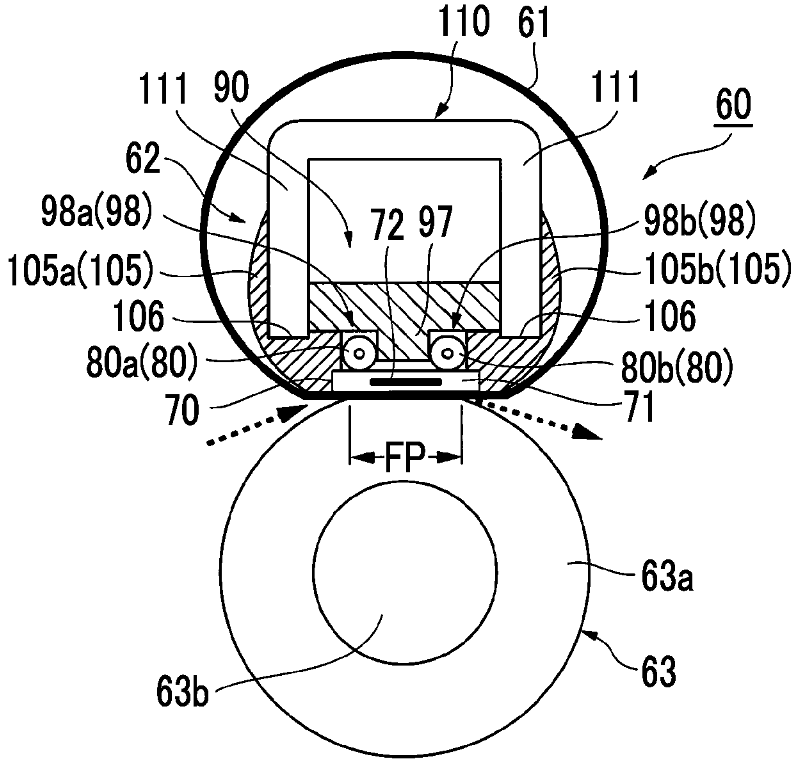
FIG. 3A is an explanatory diagram showing an example of a fixing device as the heating process apparatus shown in FIG. 2.
Figure 3B:
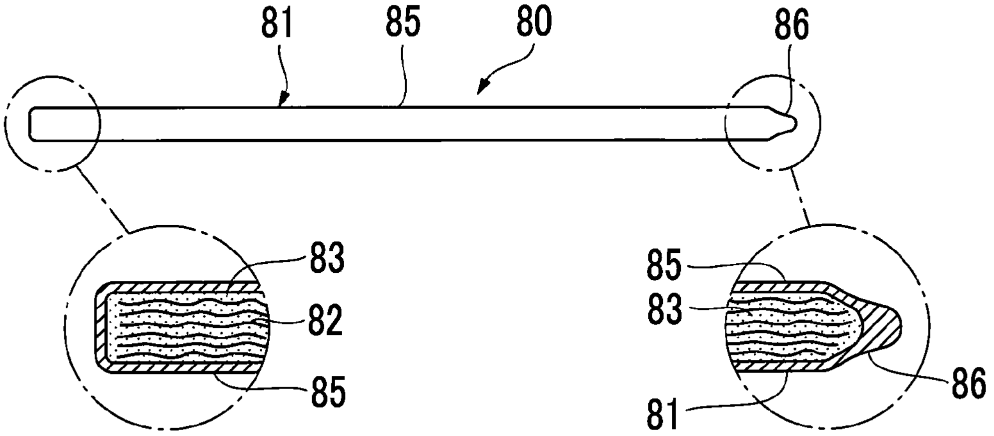
FIG. 3B is an explanatory diagram showing a configuration example of a heat pipe in FIG. 3A.

In FIGS. 3A and 3B, the fixing device 60 includes a fixing belt 61 as a heated body which has a width dimension for fixing the medium S moving in the transport direction, and circulates and moves; a heating device 62 that is provided in contact with the back surface side of the fixing belt 61 to heat the fixing belt 61; and a pressurization roll 63 as a pressurization unit which rotates in contact with a part facing the heating device 62 with the fixing belt 61 interposed therebetween, and pressurizes the medium S in which the unfixed image is held in a fixing region (contact region) FP.

Here, the fixing belt 61 is an endless heat conduction belt having flexibility and heat resistance. As the fixing belt 61, a belt molded into a cylindrical shape using a material such as synthetic resin, for example, polyimide or polyamide is applied.

Further, the pressurization roll 63 is provided with an elastic layer, a release layer, and the like on the outer peripheral surface of a columnar or cylindrical roll substrate 63*a* consisting of metal, for example. A shaft portion 63*b* of the pressurization roll 63 is rotatably supported by bearings (not shown) at both end portions in the axial direction, and the pressurization roll 63 is pressurized toward the heating device 62 by a pressurization mechanism (not shown).

Further, in this example, the pressurization roll 63 is configured such that a driving force from a driving source (not shown) is transmitted via a driving transmission mechanism (not shown), and is driven to rotate at a required time period such as an image forming operation, and accordingly, the fixing belt 61 is rotated following the pressurization roll 63. It is needless to say that the fixing belt 61 may be driven to rotate, and thereby the pressurization roll 63 may be driven to rotate.

Heating Device

In this example, the heating device 62 is a device that heats the medium S, which is pressurized and transported by being sandwiched between the fixing belt 61 and the pressurization roll 63, via the fixing belt 61.

Further, in the heating device 62, in a case where the medium S having a width dimension smaller than the maximum size continuously passes through the fixing region FP, a region through which the medium S does not pass (non-medium passing region) is generated in the fixing region FP, and heat is not taken away by the passing medium S in this non-medium passing region. Therefore, in the fixing region FP, the temperature of the non-medium passing region is locally increased as compared to a medium passing region, and as a result, a fixing temperature distribution in the fixing region FP may be non-uniform in a width direction.

In this example, in consideration of suppressing an unnecessary rise in temperature in the non-medium passing region in the fixing region FP, the heating device 62 includes a planar heater 70 as a long heat generation unit which is disposed on the back surface side of the fixing belt 61 corresponding to the fixing region FP, and extends in the width direction intersecting the transport direction of the medium S;

a heat pipe 80 which extends in the longitudinal direction of the planar heater 70, and is disposed in contact with the back surface side of the planar heater 70; and a holder 90 which holds the planar heater 70 and the heat pipe 80.

Planar Heater

In this example, the planar heater 70 has a substrate 71; a heat generation portion 72 provided on the surface of the substrate 71 on a side in contact with the inner peripheral surface of the fixing belt 61; and a wiring portion (not shown) for supplying power to the heat generation portion 72.

Here, the substrate 71 is a rectangular plate-shaped member of which the length dimension in the width direction intersecting the transport direction of the medium S is longer than the maximum size. The substrate 71 consists of a material having electrical insulation, and for example, a ceramic substrate is used as the substrate 71.

Further, the heat generation portion 72 is a heating wire portion consisting of a heat generation resistor provided linearly along the longitudinal direction on one surface of the substrate 71, although one heat generation portion 72 is schematically shown in the drawing, the heat generation portion 72 is usually configured by a plurality of (for example, three) heating wire portions that are separated from each other, and the heat generation portion 72 is adapted to have regions that generate a relatively large amount of heat to accommodate the differences in width dimensions at the time of the transportation of the medium S, at different positions.

Heat Pipe

In this example, two heat pipes 80 are arranged in a state of being in contact with each other at both sides along the longitudinal direction, on a surface (back surface) of the planar heater 70, which is on a side opposite to the surface in contact with the fixing belt 61.

As shown in FIG. 3B, each of the heat pipes 80 (specifically, heat pipes 80*a* and 80*b*) is a sealed tube 81 obtained by closing both ends of a cylinder consisting of a material having excellent thermal conductivity such as copper or stainless steel, and is obtained such that the inner peripheral wall of the sealed tube 81 is made into a capillary structure (so-called wick) 82 and a volatile hydraulic fluid (pure water or the like) 83 is sealed inside the sealed tube 81. Further, the two heat pipes 80 (80*a*, 80*b*) have substantially the same length as the length of the heat generation portion 72 of the planar heater 70, and are used by being arranged in parallel, so that a heat pipe having a relatively small diameter (for example, the outer diameter is several millimeters) is applied.

In this example, the sealed tube 81 is obtained such a bottomed pipe member 85 having an open end is used, the inner peripheral wall of the pipe member 85 is formed into the capillary structure 82, the hydraulic fluid 83 flows in from the opening of the one end, and then the opening of the one end of the pipe member 85 is sealed by a caulking portion 86 as the sealing portion.

Here, the caulking portion 86 is a portion that has undergone processing such that the end portion of the pipe member 85 is closed in a state of being crushed and joined in a vacuum, for example, and is a portion having a thinner wall thickness and a weaker strength as compared with the outer diameter portion of the normal pipe member 85 other than the caulking portion 86. The caulking portion 86 has a tip portion having a diameter smaller than the outer diameter portion of the normal pipe member 85, and is configured as a protruding portion protruding from the end portion of the normal pipe member 85, but the external shape of the caulking portion 86 is not particularly limited. In this example, an example in which the caulking portion 86 is used as the sealing portion is shown, but it is needless to say that a portion that is subjected to a joining process such as welding may be used as the sealing portion.

Holder

In this example, as shown in FIGS. 3A and 4A to 4C, the holder 90 has a holder body 91 by which the planar heater 70 is held, and in the holder body 91, a heat pipe holding portion 95 is formed as a holding unit by which the heat pipe 80 is held, and a guide portion 105 by which a movement locus of the fixing belt 61 is guided, and the holder 90 is configured such that the holder body 91 is fixed to a support bracket 110 for mounting.

Holder Body

In this example, the holder body 91 is integrally formed to have a long length along the width direction of the medium S with a material having heat resistance (for example, heat resistant resins such as LCP, PPS, and PET), and has an accommodation recess 92 in which the planar heater 70 is accommodated, on the surface facing the fixing belt 61. The accommodation recess 92 is formed in a long rectangular shape substantially similar to the cross-sectional shape of the planar heater 70, has a depth dimension slightly shallower than the thickness dimension of the planar heater 70, and is disposed such that in a case where the planar heater 70 is accommodated, the surface of the planar heater 70 slightly protrudes from the surface of the holder body 91 to be in contact with the back surface of the fixing belt 61.

Heat Pipe Holding Portion

In this example, in the bottom of the accommodation recess 92, the heat pipe holding portion 95 is formed at a portion corresponding to the heat generation region of the planar heater 70 by the heat generation portion 72. The heat pipe holding portion 95 secures a recess 96 used as an accommodation space for the heat pipes 80 (80*a*, 80*b*) at the bottom of the accommodation recess 92, and accommodation receiving grooves 98 (specifically, 98*a*, 98*b*) as the accommodation receiving portions for accommodating both side portions of the heat pipes 80 (80*a*, 80*b*) are provided on both side walls 97 of the recess 96 in the longitudinal direction. As shown in FIGS. 3A and 4A to 4C, the accommodation receiving groove 98 are provided apart from each other in the lateral direction of the holder body 91 so that the heat pipes 80 (80*a*, 80*b*) are arranged in parallel.

Further, the width dimension of the accommodation receiving groove 98 is selected to be substantially the same as the dimension of the heat pipe 80 in the radial direction. Further, an appropriate number of spacers 99 are provided integrally or separately on the bottom wall of the accommodation receiving groove 98 or the recess 96 with a material having heat resistance to be able to adjust the accommodation height position of the heat pipe 80, and thus the contact state between the heat pipe 80 and the planar heater 70 is maintained.

Furthermore, the temperature of the non-medium passing region of the planar heater 70 often becomes a high temperature of about 200° C. to be transmitted to the heat pipe 80, and the heat pipe 80 has a characteristic of being easily thermally expanded and deformed in the longitudinal direction. Therefore, it is necessary to secure a required gap 100 (refer to FIGS. 5A to 5D) between the depth-side end portion of the accommodation receiving groove 98 and the end portion of the heat pipe 80 in consideration of the thermal expansion deformation of the heat pipe 80.

Further, in this example, since the structure is such that the required gap 100 is secured in the accommodation receiving grooves 98 (98*a*, 98*b*), as shown in FIGS. 4A to 5D, a protective component 120 that keeps the end portion on the caulking portion 86 side and the depth-side end portion of the accommodation receiving groove 98 in a non-contact manner via the space portion is interposed between the end portion on the caulking portion 86 side as the sealing portion of the heat pipe 80 and the depth-side end portion of the accommodation receiving groove 98, and an elastic component 130 that can be elastically deformed is interposed between the end portion on a side opposite to the caulking portion 86 of the heat pipe 80 and the depth-side end portion of the accommodation receiving groove 98.

Protective Component

Figure 5A:
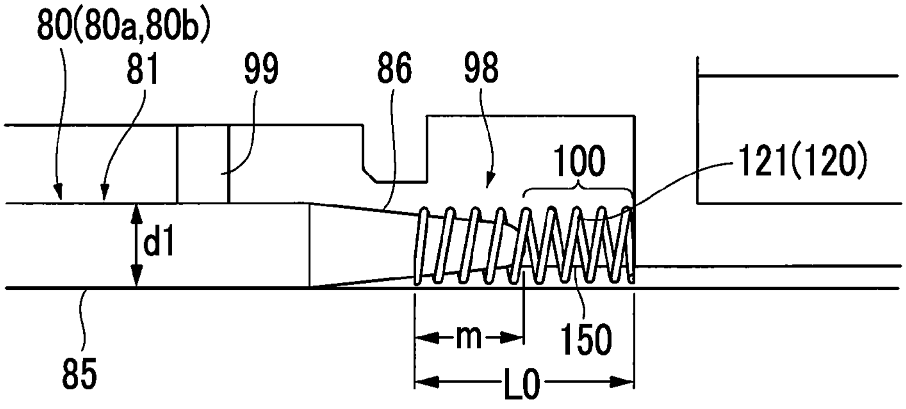
FIG. 5A is an explanatory diagram showing details of the holding structure of an end portion on a sealing portion side of the heat pipe shown in FIG. 4C.
Figure 5B:
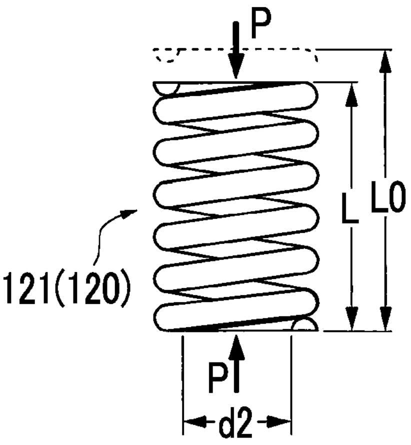
FIG. 5B is an explanatory diagram showing each parameter in a case where a compression coil spring as a protective component is in a stretched state.
Figure 5C:
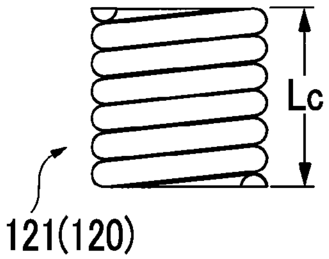
FIG. 5C is an explanatory diagram showing a parameter in a case where the compression coil spring as the protective component is maximally compressed.

In this example, as shown in FIGS. 5A to 5C, the protective component 120 utilizes a compression coil spring 121 as the elastic member that can be elastically deformed along the longitudinal direction of the heat pipe 80. The compression coil spring 121 has an inner diameter d2 smaller than the outer diameter d1 of the normal pipe member 85 other than the caulking portion 86 of the heat pipe 80, the end portion of the compression coil spring 121 is caught in the middle of the caulking portion 86 so as to avoid a situation in which the end portion of the compression coil spring 121 gets over the caulking portion 86 to move toward the normal pipe member 85.

Further, assuming that the free length of the compression coil spring 121 is L0, the solid length is Lc, the amount of compression deformation due to an external force P is L, and the dimension of the caulking portion 86 of the heat pipe 80 protruding to the region where the compression coil spring 121 is mounted is m, the compression coil spring 121 is compressed and deformed to satisfy Lc≤L≤L0, but for example, it is preferable to satisfy a relationship of at least m<Lc so that the tip of the caulking portion 86 does not come into contact with the depth-side end portion of the accommodation receiving groove 98.

Elastic Component

Figure 5D:
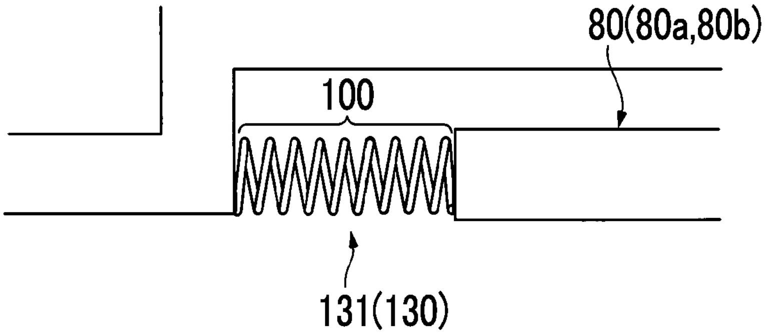
FIG. 5D is an explanatory diagram showing details of a holding structure of an end portion on the opposite side of the heat pipe shown in FIG. 4B.

Further, as shown in FIG. 5D, the elastic component 130 utilizes a compression coil spring 131 as the elastic member that can be elastically deformed along the longitudinal direction of the heat pipe 80. It suffices that the compression coil spring 131 has the inner diameter d2 smaller than the outer diameter d1 of the normal pipe member 85 other than the caulking portion 86 of the heat pipe 80, and is interposed between the end portion on a side opposite to the caulking portion 86 of the heat pipe 80 and the depth-side end portion of the accommodation receiving groove 98. In this example, the compression coil spring 131 as the elastic component 130 may be substantially the same as the compression coil spring 121 as the protective component 120.

In this example, the compression coil spring 131 is used, but it is not necessary to keep the end portion of the heat pipe 80 and the depth-side end portion of the accommodation receiving groove 98 in a non-contact manner via the space portion as required for the protective component 120, so that a well-known member having elasticity such as a leaf spring, an elastic spacer, or rubber that is in contact between the end portion of the heat pipe 80 and the depth-side end portion of the accommodation receiving groove 98 may be used as the elastic member.

Guide Portion

In this example, as shown in FIGS. 3A to 4C, the guide portion 105 includes an introduction guide portion 105*a* in which a curved guide surface that guides the fixing belt 61 to be introduced into the fixing region FP is formed; and an extraction guide portion 105*b* in which a curved guide surface that guides the fixing belt 61 in an extraction direction from the fixing region FP is formed, and the introduction guide portion 105*a* and the extraction guide portion 105*b* are integrally formed in the front and rear of the holder body 91 in the transport direction of the medium S. The introduction guide portion 105*a* and the extraction guide portion 105*b* are arranged so as to sandwich the support bracket 110.

Holder Mounting Structure

In this example, as shown in FIG. 3A, the support bracket 110 is a member longer than the length of the planar heater 70 in the longitudinal direction, and is configured of, for example, a channel material having a U-shaped cross section such that a pair of leg portions 111 are arranged to protrude toward the holder 90.

Therefore, in this example, a mounting groove 106 into which the tip of the leg portion 111 of the support bracket 110 is fitted is formed on the back surface side of the holder body 91, and the holder 90 is attached to the support bracket 110 in a state where the tip of the leg portion 111 of the support bracket 110 is fitted into the mounting groove 106.

Then, both end portions of the support bracket 110 in the longitudinal direction are mounted and fixed to a mounting portion (not shown) provided on the inner wall surface of a fixing device housing (not shown), and the heating device 62 is disposed in the fixing belt 61.

Sensor Mounting Structure

In this example, the temperature of the heat generation portion 72 of the planar heater 70 is controlled by a control device (not shown). For the temperature control, a temperature sensor (not shown) is disposed to be in contact with a required portion on the back surface of the substrate 71 of the planar heater 70, and measurement information of the temperature sensor is fed back to the control device (not shown).

Figure 4A:
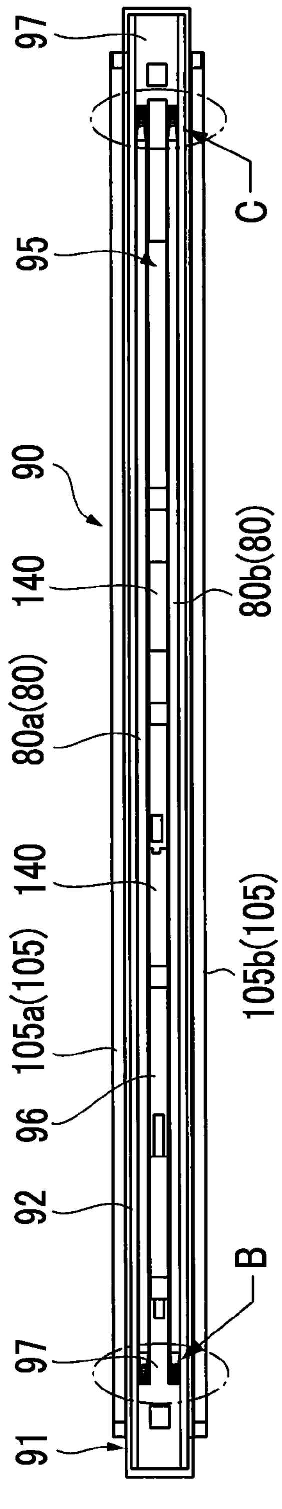
FIG. 4A is an explanatory diagram showing an example of a holding structure of a heat pipe of a heating device used in the fixing device shown in FIG. 3A.
Figure 4C:
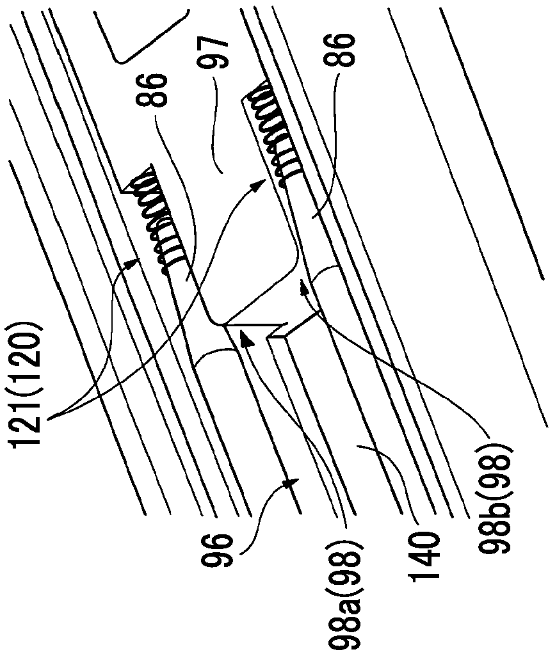
FIG. 4C is an enlarged view of a portion C in FIG. 4A.
Figure 4B:
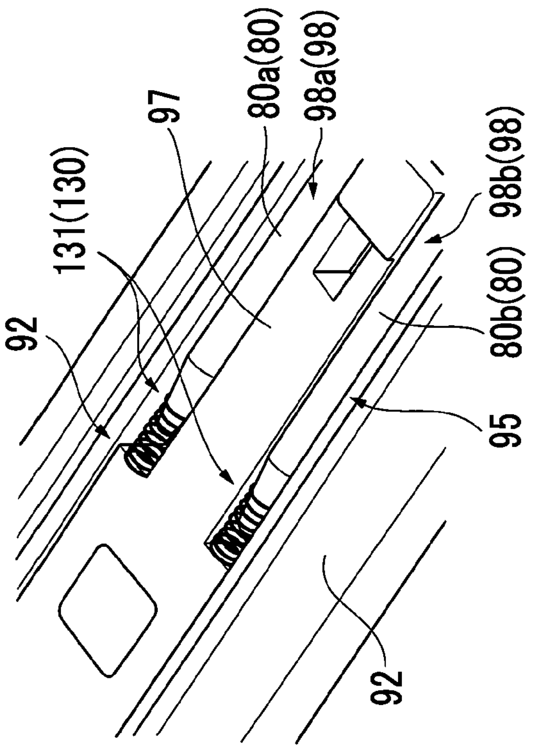
FIG. 4B is an enlarged view of a portion B in FIG. 4A.

Therefore, in this example, as shown in FIG. 4A, a sensor opening 140 is appropriately provided at the bottom of the recess 96 of the holder body 91, and the temperature sensor (not shown) is assembled through the sensor opening 140.

Fixing Operation of Fixing Device

Next, the operation of the fixing device according to the present exemplary embodiment will be described.

In the image forming apparatus shown in FIG. 2, in a case where an image is continuously formed on the medium S having a size smaller than the maximum size, the toner images of respective color components formed by the image forming units 22 (22*a* to 22*d*) are collectively transferred to the medium S by the secondary transfer device 25 via the intermediate transfer body 23, and the transferred unfixed image is held on the medium S, and reaches the fixing device 60.

In this state, in the fixing device 60, the heat generation portion 72 of the planar heater 70 generates heat to heat the fixing belt 61, and the medium S in which the unfixed image is held is sandwiched and transferred to the fixing region FP between the fixing belt 61 and the pressurization roll 63. Therefore, the unfixed image on the medium S is fixed in a state of being heated and pressurized in the fixing region FP.

In this case, in a case where the medium S having a size smaller than the maximum size continuously passes through the fixing region FP, a non-medium passing region is generated in the fixing region FP and thus the temperature of the non-medium passing region may be increased. However, in the present exemplary embodiment, the heat in a region corresponding to the non-medium passing region of the heat generation portion 72 of the planar heater 70 is transferred, by the action of heat transfer of the heat pipes 80 (80*a*, 80*b*), to the medium passing region of the planar heater 70 of which the temperature is relatively lower than the temperature of the non-medium passing region.

As a result, in the fixing device 60, the temperature increase in the non-medium passing region is suppressed as compared with the case where the heat pipe 80 is not disposed.

In particular, in this example, since the two heat pipes 80 (80*a*, 80*b*) are arranged in parallel with an interval in the transport direction of the medium S, the temperature increase is evenly and efficiently suppressed even in the front and rear of the non-medium passing region in the transport direction of the medium S as compared with a case where one heat pipe is disposed.

Protection Operation of Heat Pipe

In this example, both side portions of the heat pipe 80 (80*a*, 80*b*) in the longitudinal direction are accommodated in the accommodation receiving grooves 98 of the holder 90, the caulking portion 86 of the heat pipe 80 is elastically held by the protective component 120 having elasticity (specifically, the compression coil spring 121), and the end portion on a side opposite to the caulking portion 86 of the heat pipe 80 is elastically held by the elastic component 130 (specifically, the compression coil spring 131).

In this case, in a case where the heat pipe 80 is thermally expanded and deformed, the caulking portion 86 and the end portion on a side opposite to the caulking portion 86 of the heat pipe 80 tend to be displaced outward in the longitudinal direction of the heat pipe 80 due to thermal expansion deformation.

However, the displacement of the caulking portion 86 of the heat pipe 80 is absorbed by the compression deformation of the compression coil spring 121, and even in a case where the compression coil spring 121 is compressed and deformed to have the solid length Lc, the non-contact state with respect to the depth-side end portion of the accommodation receiving groove 98 is kept via the space portion. Therefore, the caulking portion 86 of the heat pipe 80 does not strongly abut against the depth-side end portion of the accommodation receiving groove 98, and thus the caulking portion 86 may not be damaged. On the other hand, the displacement of the end portion on a side opposite to the caulking portion 86 of the heat pipe 80 is absorbed by the compression deformation of the compression coil spring 131 as the elastic component 130, and the end portion of the heat pipe 80 does not strongly abut against the depth-side end portion of the accommodation receiving groove 98.

Further, in a case where the fixing device 60 for replacement is accidentally dropped during transportation, the heat pipe 80 may move in the longitudinal direction due to the impact force at the time of being dropped.

However, in this example, even in a case where the caulking portion 86 of the heat pipe 80 tries to move toward the depth-side end portion of the accommodation receiving groove 98, the movement of the caulking portion 86 is elastically received by the compression coil spring 121, and due to the presence of the compression coil spring 121, the non-contact state with respect to the depth-side end portion of the accommodation receiving groove 98 is always kept via a space portion 150. Therefore, the caulking portion 86 of the heat pipe 80 does not strongly abut against the depth-side end portion of the accommodation receiving groove 98, and thus the caulking portion 86 may not be damaged. Further, even in a case where the end portion positioned on a side opposite to the caulking portion 86 of the heat pipe 80 tries to move toward the depth-side end portion of the accommodation receiving groove 98, the movement is elastically received by the compression coil spring 131, and thus the end portion of the heat pipe 80 does not strongly abut against the depth-side end portion of the accommodation receiving groove 98.

In particular, in this example, since both ends of the heat pipe 80 (80*a*, 80*b*) are elastically held by the protective component 120 having elasticity and the elastic component 130, even in a case where a situation occurs in which the fixing device 60 is dropped, a situation is avoided in which not only the caulking portion 86 of the heat pipe 80 but also the end portion positioned on a side opposite to the caulking portion 86 of the heat pipe 80 collides with the depth-side end portion of the accommodation receiving groove 98. Therefore, not only the caulking portion 86 of the heat pipe 80 but also the end portion positioned on a side opposite to the caulking portion 86 may not be damaged. Further, even in a case where the heat pipe 80 is thermally expanded and deformed, the caulking portion 86 and the end portion positioned on a side opposite to the caulking portion 86 of the heat pipe 80 do not directly abut against the depth-side end portion of the accommodation receiving groove 98, and therefore, a situation is also suppressed in which a large stress is applied to both end portions of the heat pipe 80 depending on the thermal expansion deformation.

First Comparative Example

Figure 6A:
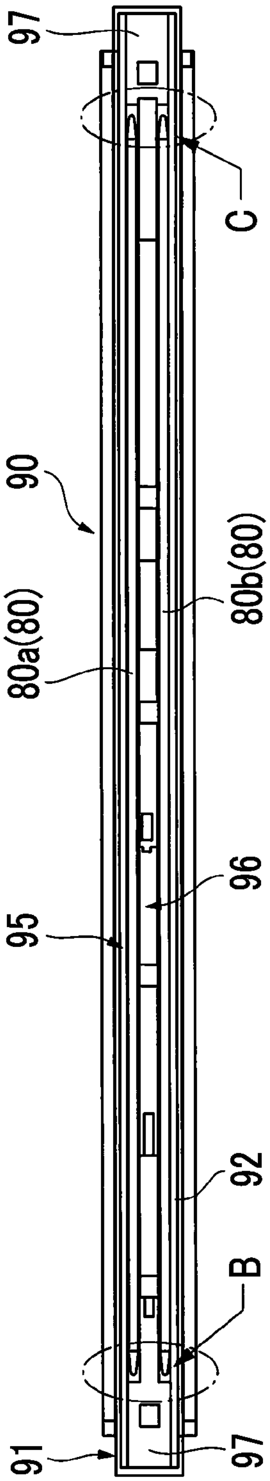
FIG. 6A is an explanatory diagram showing an example of a holding structure of a heat pipe of a heating device according to a first comparative example.
Figure 6C:
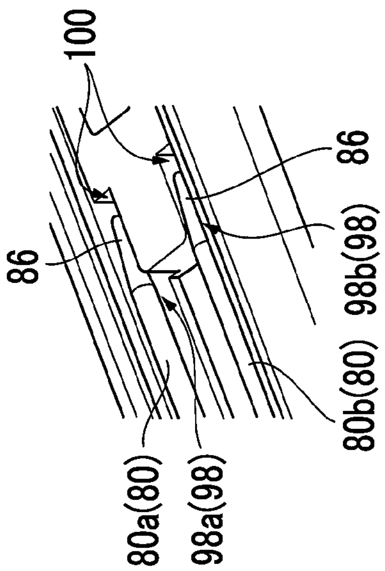
FIG. 6C is an enlarged view of a portion C in FIG. 6A.
Figure 6B:
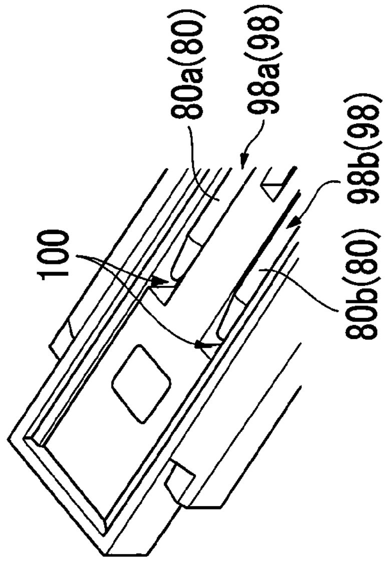
FIG. 6B is an enlarged view of a portion B in FIG. 6A.

FIGS. 6A to 6C show a holding structure of the heat pipe 80 used in the fixing device according to a first comparative example.

In FIGS. 6A to 6C, the heat pipes 80 (80*a*, 80*b*) are held in the accommodation receiving grooves 98 of the holder 90 as in the first exemplary embodiment, but the protective component 120 and the elastic component 130 are not used, and the gap 100 remains intact between each of the caulking portion 86 and the end portion on a side opposite to the caulking portion 86 of the heat pipe 80 and the depth-side end portion of the accommodation receiving groove 98.

In this comparative example, even in a case where the heat pipe 80 is thermally expanded and deformed, a situation in which the caulking portion 86 of the heat pipe 80 strongly abuts against the depth-side end portion of the accommodation receiving groove 98 may be avoided due to the presence of the gap 100.

However, in such a case where the fixing device for replacement is accidentally dropped during transportation, the caulking portion 86 of the heat pipe 80 strongly abuts against the depth-side end portion of the accommodation receiving groove 98 due to the impact force at the time of being dropped so that the caulking portion 86 may be damaged.

First Modification

In the present exemplary embodiment, both side portions of the heat pipe 80 (80*a*, 80*b*) in the longitudinal direction are respectively accommodated in the accommodation receiving grooves 98, the caulking portion 86 of the heat pipe 80 is protected by the protective component 120 having elasticity (specifically, the compression coil spring 121), and the end portion positioned on a side opposite to the caulking portion 86 of the heat pipe 80 is elastically held by the elastic component 130 (specifically, the compression coil spring 131). However, the holding structure of the heat pipe 80 is not limited thereto, and for example, as shown in the following first and second modifications, the holding structure may be appropriately selected.

Figure 7A:
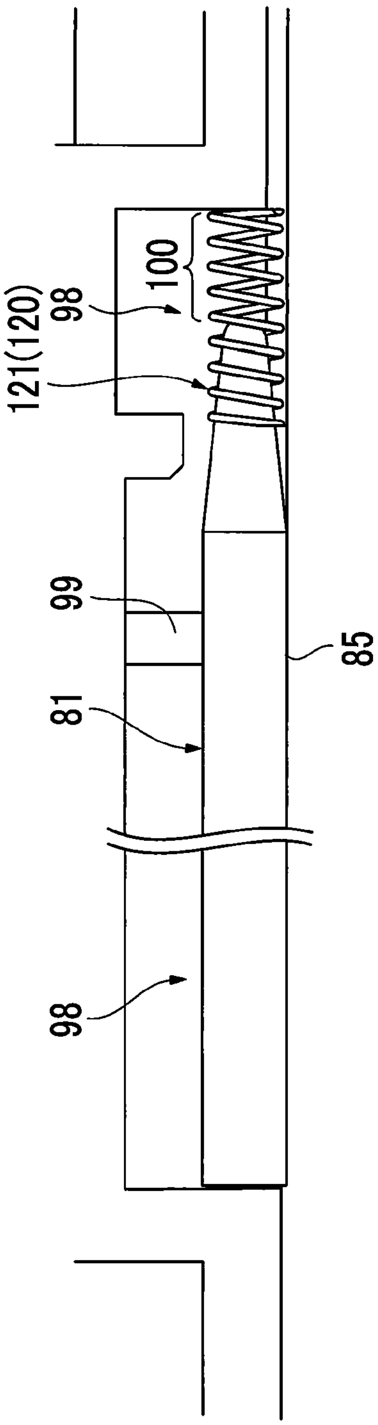
FIG. 7A is an explanatory diagram showing an example of a holding structure of a heat pipe of a heating device according to a first modification.

FIG. 7A shows the holding structure of the heat pipe in the first modification.

In FIG. 7A, in the holding structure of the heat pipe 80, the protective component 120 (specifically, the compression coil spring 121) having the same elasticity as the elasticity in the first exemplary embodiment is interposed between the caulking portion 86 of the heat pipe 80 and the accommodation receiving groove 98 as in the first exemplary embodiment, but the end portion positioned on a side opposite to the caulking portion 86 of the heat pipe 80 is disposed to be in contact with the depth-side end portion of the accommodation receiving groove 98, unlike the first exemplary embodiment.

In this example, in a case where the heat pipe 80 is thermally expanded and deformed, the end portion positioned on a side opposite to the caulking portion 86 of the heat pipe 80 is restricted to be positioned at the depth-side end portion of the accommodation receiving groove 98 by the urging force of the compression coil spring 121, and therefore, only the caulking portion 86 of the heat pipe 80 is displaced toward the depth-side end portion of the accommodation receiving groove 98. However, the displacement of the caulking portion 86 is absorbed by the compression deformation of the compression coil spring 121, and thus the caulking portion 86 does not strongly abut against the depth-side end portion of the accommodation receiving groove 98.

Further, in a case where the fixing device for replacement is accidentally dropped, even in a case where the caulking portion 86 of the heat pipe 80 tries to move toward the depth-side end portion of the accommodation receiving groove 98 due to the impact force at the time of being dropped, the movement of the caulking portion 86 is elastically received by the compression coil spring 121, and due to the presence of the compression coil spring 121, the non-contact state with respect to the depth-side end portion of the accommodation receiving groove 98 is always kept via the space portion 150. Therefore, the caulking portion 86 of the heat pipe 80 does not strongly abut against the depth-side end portion of the accommodation receiving groove 98, and thus the caulking portion 86 may not be damaged.

Second Modification

Figure 7B:
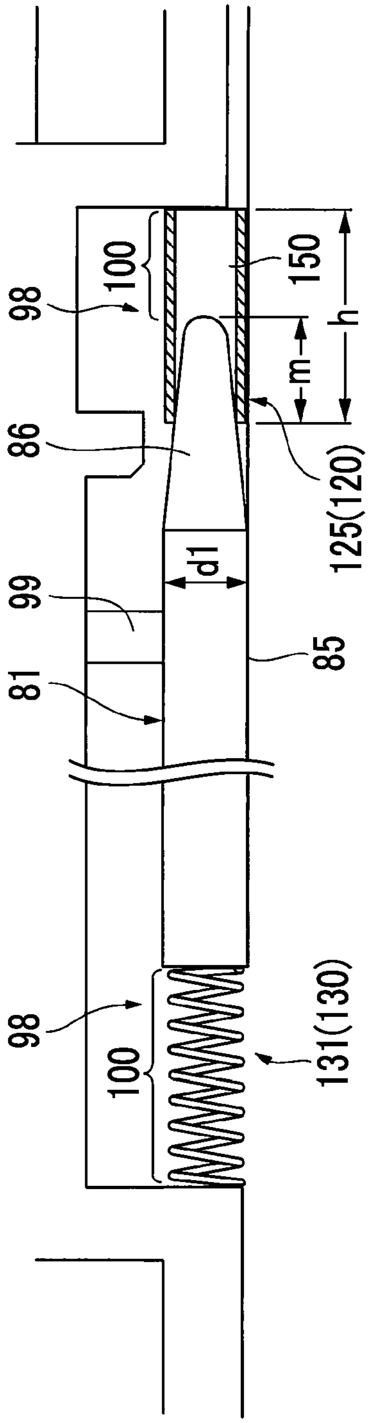
FIG. 7B is an explanatory diagram showing an example of a holding structure of a heat pipe of a heating device according to a second modification.

FIG. 7B shows the holding structure of the heat pipe in the second modification.

In FIG. 7B, in the holding structure of the heat pipe 80, the compression coil spring 131 as the elastic component 130 similar to the first exemplary embodiment is interposed between the end portion on a side opposite to the caulking portion 86 of the heat pipe 80 and the depth-side end portion of the accommodation receiving groove 98 as in the first exemplary embodiment, but the inelastic member is used as the protective component 120 between the caulking portion 86 of the heat pipe 80 and the depth-side end portion of the accommodation receiving groove 98, unlike the first exemplary embodiment.

That is, in this example, the protective component 120 is a cylindrical member 125 having both ends opened, which is molded using a material having heat resistance (for example, metal materials such as SUS, SUM, and aluminum, and heat resistant resins such as LCP, PPS, PET, PA, and PC) as the inelastic member. The cylindrical member 125 has an inner diameter smaller than the outer diameter d1 of the normal pipe member 85 of the heat pipe 80, and is configured to surround the end portion on the caulking portion 86 side of the heat pipe 80. Then, assuming that the axial length of the cylindrical member 125 is h, and the dimension of the caulking portion 86 of the heat pipe 80 protruding in the longitudinal direction in the region where the cylindrical member 125 is mounted is m, the configuration is selected to satisfy a relationship of $h>m$.

In this example, in a case where the heat pipe 80 is thermally expanded and deformed, the caulking portion 86 side of the heat pipe 80 is restricted to be positioned at the end portion of the cylindrical member 125 on the heat pipe 80 side, which is dammed by the depth-side end portion of the accommodation receiving groove 98, and therefore, only the end portion positioned on a side opposite to the caulking portion 86 of the heat pipe 80 is displaced toward the depth-side end portion of the accommodation receiving groove 98. However, the displacement of the end portion positioned on a side opposite to the caulking portion 86 is absorbed by the compression deformation of the compression coil spring 131, and thus the end portion positioned on a side opposite to the caulking portion 86 does not strongly abut against the depth-side end portion of the accommodation receiving groove 98.

Further, in a case where the fixing device for replacement is accidentally dropped, even in a case where the caulking portion 86 of the heat pipe 80 tries to move toward the depth-side end portion of the accommodation receiving groove 98 due to the impact force at the time of being dropped, the movement of the caulking portion 86 is dammed by the cylindrical member 125. In this case, the cylindrical member 125 surrounds the end portion on the caulking portion 86 side of the heat pipe 80, and abuts against the small diameter portion of the caulking portion 86 near the normal pipe member 85, but the end portion positioned on a side opposite to the caulking portion 86 of the heat pipe 80 is elastically held by the compression coil spring 131, so that the force of the cylindrical member 125 abutting against the small diameter portion of the caulking portion 86 is partially absorbed by the compression deformation of the compression coil spring 131, the force abutting against the small diameter portion of the caulking portion 86 is reduced by the absorbed amount, and thereby the small diameter portion of the caulking portion 86 may not be damaged. Further, since the caulking portion 86 of the heat pipe 80 is always kept in a non-contact state with respect to the depth-side end portion of the accommodation receiving groove 98 via the space portion 150 due to the presence of the cylindrical member 125, the caulking portion 86 of the heat pipe 80 does not strongly abut against the depth-side end portion of the accommodation receiving groove 98, and thus the caulking portion 86 may not be damaged.

In the present exemplary embodiment, the heating device 62 is shown as an example applied to the fixing device of the image forming apparatus, but the present disclosure is not limited thereto.

That is, the heating device of the exemplary embodiment of the invention can be widely applied to a heating process apparatus that requires a heating process, such as devices with other image forming types, medium drying devices that heat or dry the medium transferred by the medium transfer device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A heating device configured for a fixing device of an image forming apparatus, the heating device comprising:
- a heater that is configured to heat a heated body surrounding the heater;
- a heat pipe that extends along a longitudinal direction of the heater by being in contact with the heater or the heated body; and
- a holder that holds the heat pipe,
- wherein the holder has
  - an accommodation receiving groove that accommodates the heat pipe, and
  - a protective component that keeps an end portion of the heat pipe on a sealing portion side of the heat pipe and an end portion of the accommodation receiving groove in a non-contact manner via a space portion,
- wherein the protective component is an elastic member that is able to be elastically deformed along the longitudinal direction,
- wherein the end portion of the heat pipe is inserted into the protective component.

2. The heating device according to claim 1, wherein the protective component is a compression coil spring that has an inner diameter smaller than an outer diameter of the heat pipe and is able to be elastically deformed along the longitudinal direction.

3. The heating device according to claim 2, wherein the protective component is the compression coil spring having a solid length longer than a dimension of the sealing portion of the heat pipe protruding in the longitudinal direction in a region where the protective component is mounted.

4. The heating device according to claim 1, wherein another elastic member is interposed between an end portion of the accommodation receiving groove and an end portion of the heat pipe on a side opposite to the sealing portion of the heat pipe in the longitudinal direction.

5. A fixing device comprising:

a rotating belt-shaped heated body;

the heating device according to claim 1 provided in the heated body; and a pressurization roll that rotates in contact with a portion facing the heater of the heated body to pressurize a heating process target.

6. An image forming apparatus comprising:

the fixing device according to claim 5, wherein the fixing device heats and pressurizes a medium on which an unfixed image is held to fix the unfixed image on the medium; and an imaging unit that forms the unfixed image on the medium, wherein the imaging unit comprises a photoconductor.

7. The heating device according to claim 1, wherein a spacer is disposed between the accommodation receiving groove and the heat pipe in a direction perpendicular to the longitudinal direction.

* * * * *